(12) United States Patent
Tran (10) Patent No.: US 11,405,589 B1
(45) Date of Patent: Aug. 2, 2022

(54) INTERACTIVE VIDEO CONFERENCING INTERFACE

(71) Applicant: NOONCAKE INC, Renton, WA (US)

(72) Inventor: Thinh Tran, Renton, WA (US)

(73) Assignee: Nooncake Inc, Renton, WA (US)

(*) Notice: Subject to any disclaimer, the term of this patent is extended or adjusted under 35 U.S.C. 154(b) by 0 days.

(21) Appl. No.: 17/330,217

(22) Filed: May 25, 2021

(51) Int. Cl.
*H04N 7/15* (2006.01)
*H04L 12/18* (2006.01)

(52) U.S. Cl.
CPC ......... *H04N 7/157* (2013.01); *H04L 12/1822* (2013.01)

(58) Field of Classification Search
None
See application file for complete search history.

(56) References Cited

U.S. PATENT DOCUMENTS

| | | | |
|---|---|---|---|
| 9,113,032 B1* | 8/2015 | Vander Mey | H04N 7/15 |
| 11,050,975 B1* | 6/2021 | Petuchowski | H04N 7/15 |
| 2007/0211141 A1* | 9/2007 | Christiansen | H04L 29/06027 348/14.08 |
| 2010/0309284 A1* | 12/2010 | Samadani | H04N 21/42203 348/14.08 |
| 2012/0002001 A1* | 1/2012 | Prentice | H04N 7/147 348/14.08 |
| 2013/0169742 A1* | 7/2013 | Wu | H04N 7/152 348/14.08 |
| 2015/0085056 A1* | 3/2015 | Van Broeck | G06F 3/013 348/14.1 |
| 2017/0344327 A1* | 11/2017 | Faulkner | G06Q 10/10 |
| 2021/0176429 A1* | 6/2021 | Peters | H04N 7/152 |

* cited by examiner

*Primary Examiner* — Stella L. Woo
(74) *Attorney, Agent, or Firm* — Seed IP Law Group LLP (57) ABSTRACT

A system for facilitating a video conference is described herein to adjust one or more visual aspects of a presentation container that represents a participant of the video conference based on the level of engagement of the participants in the video conference. Engagement level data describing a participant of the video conference is obtained from the participant's computing devices. The engagement level data is used to generate an engagement level describing how engaged the participant is in the video conference. The size, position, or other visual aspect of that participant's presentation container is adjusted based on the participant's engagement level.

7 Claims, 5 Drawing Sheets

INTERACTIVE VIDEO CONFERENCING INTERFACE

TECHNICAL FIELD

The present disclosure relates generally to video conferencing and, more particularly, to providing graphical enhancements to demonstrate participant engagement.

BACKGROUND

Description of the Related Art

Today's atmosphere of remote work and learning has caused numerous people to utilize video conferencing as a mechanism to conduct business, teach classes, and stay in touch with co-workers, friends, and family. Most video conference systems display each participant in a grid-like structure or they display the current speaker or presenter. Such systems, however, can result in a loss of understanding the mood or emotions of the meeting environment or its participants. It is with respect to these and other considerations that the embodiments described herein have been made.

BRIEF SUMMARY

Briefly stated, embodiments are directed towards systems and methods that change the presentation of participants in a video conference based on their level of engagement. The engagement level is determined based on a variety of factors, including the pitch, tone, volume, or other vocal measures of a participant's voice; the amount of movement by a participant; the amount of time spent talking by the participant; whether the participant is sharing video or not; whether the participant is on mute or not; or other visual or audible factors that can be used to determine an amount of engagement or participation of a participant in the video conference. The video conference includes a presentation container for each participant of the video conference, which is displayed to other participants in the conference. In general, the presentation container is a visual shape in which the video or representation of a participant is displayed in the video conference. As the engagement level for a participant changes, the presentation container for the participant also changes. These changes may make the participant more or less prominent, change a display position of the presentation container within the video conference, move or modify a position of the presentation container within the video conference, or other visual changes to the presentation container. In this way, the engagement level of each participants is visually indicated to other participants of the video conference. In some embodiments, the engagement level of each corresponding participant may be considered individually to change the corresponding presentation container. In other embodiments, the engagement level of multiple participants may be considered collectively to determine how those participant presentation containers, or other participant presentation containers, are to change.

The embodiments described in the present disclosure improve upon known data presentation architectures, structures, processes, and techniques to enable multi-participant video engagement in a variety of different computerized technologies, such as operating systems, user interfaces, and social networks.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
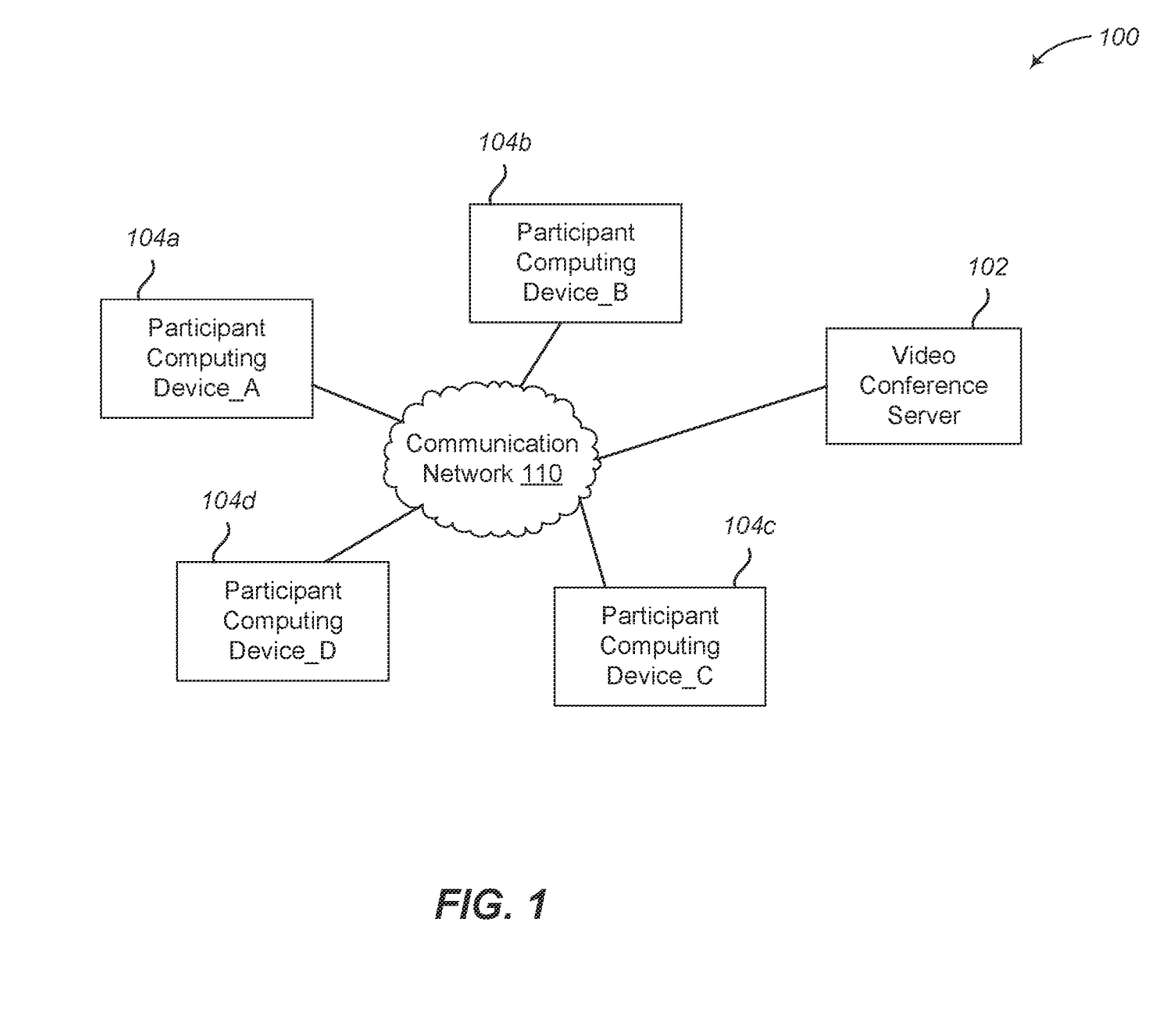
FIG. 1 illustrates a context diagram of an environment for facilitating a video conference in accordance with embodiments described herein.

FIG. 1 illustrates a context diagram of an environment for facilitating a video conference in accordance with embodiments described herein. In the illustrated example, environment 100 includes a video conference server 102, one or more participant computing devices 104a-104d, and a communication network 110.

The video conference server 102 is used to facilitate a video conference between the participant computing devices 104a-104d. In some embodiments, the functionality of the video conference server 102 may be implemented as an application, module, or other software or hardware implementation.

The video conference may include video data and audio data, only video data, or only audio data, or a combination thereof. Each participant computing device 104a-104d may provide video data, audio data, or a combination of video and audio data to the video conference server 102, which is then combined into the video conference and distributed to the participant computing devices 104a-104d. Therefore, the video conference may be a video conference, a voice-based conference, multi-participant video telephony, or other multi-participant virtual meeting. And embodiments described herein may be implemented on participant video data, participant audio data, or a combination thereof. In some embodiments, the video conference may also be referred to as a web conference.

The video conference server 102 stores and processes data used to facilitate a video conference between the participant computing devices 104a-104d. The video conference server 102 additionally determines an engagement level for participants of the video conference. The video conference server 102 obtains visual data, audio data, a combination of visual data and audio data of participants (collectively engagement level data) from each of the participant computing devices 104a-104d. The video conference server 102 analyzes the obtained data to determine the level of engagement of each participant in the conference. In some embodiments, the engagement level data includes other data which may be obtained within a video conference such as polls, interactive user interface elements within video conference software, or other data retrieval elements.

In various embodiments, the video conference server 102 determines the engagement level based on an analysis of the engagement level data received from the participant computing devices 104a-104d. The engagement level may be determined by applying statistical analysis on the engagement level data, employing a trained artificial intelligence or neural network on the engagement level data, or performing other data analysis methods on the engagement level data. For example, the statistical analysis may include: a ratio of an amount of time a participant is speaking relative to the length of the conference; a ratio of speaking time of one participant relative to speaking time of other participants; a visual change in the video of a participant (e.g. if the participant is waving their arms or the participant is no longer visible in the video); a ratio of a participant's use of interactive elements in the video conference to other participants (e.g., the use of emoticons, emoji, or filters, participating in polls, utilizing in-conference chats, etc.); changes in a participant's voice (e.g., increasing or decreasing tone, pitch, or volume, or increasing or decreasing the speed at which the participant is speaking, or the other measurements of a participant's voice); or other statistical measurements.

In some embodiments, the video conference server 102 is not a part of the environment 100 and one or more of the participant computing devices 104a-104d perform the functions of the video conference server 102. In various embodiments, the functions of the video conference server 102 are performed by a plurality of video conference servers.

The participant computing devices 104a-104d are configured as personal computing devices that are configured to enable participants to participate in a video conference managed by the video conference server 102. In some embodiments, the participant computing devices 104a-104d are separate and remote from the video conference server 102. Examples of participant computing devices 104a-104d may include, but are not limited to, mobile devices, smartphones, tablets, laptop computers, a personal computer, or other portable or stationary computing devices that include a display device. In some embodiments, one or more of the participant computing devices 104a-104d perform one or more of the functions of the video conference server 102, such as managing a video conference between the participant computing devices 104a-104d, determining an engagement level for one or more participants in the video conference, etc.

The communication network 110 is a network used to facilitate communication between the video conferencing server 102, participant computing devices 104a-104d, and other devices. The communication network 110 may be a network such as the Internet, a local network, or other type of computer network. The participant computing devices 104a-104d and video conferencing server 102 may use the network to communicate through a variety of wireless or wired methods or protocols.

Figure 2:
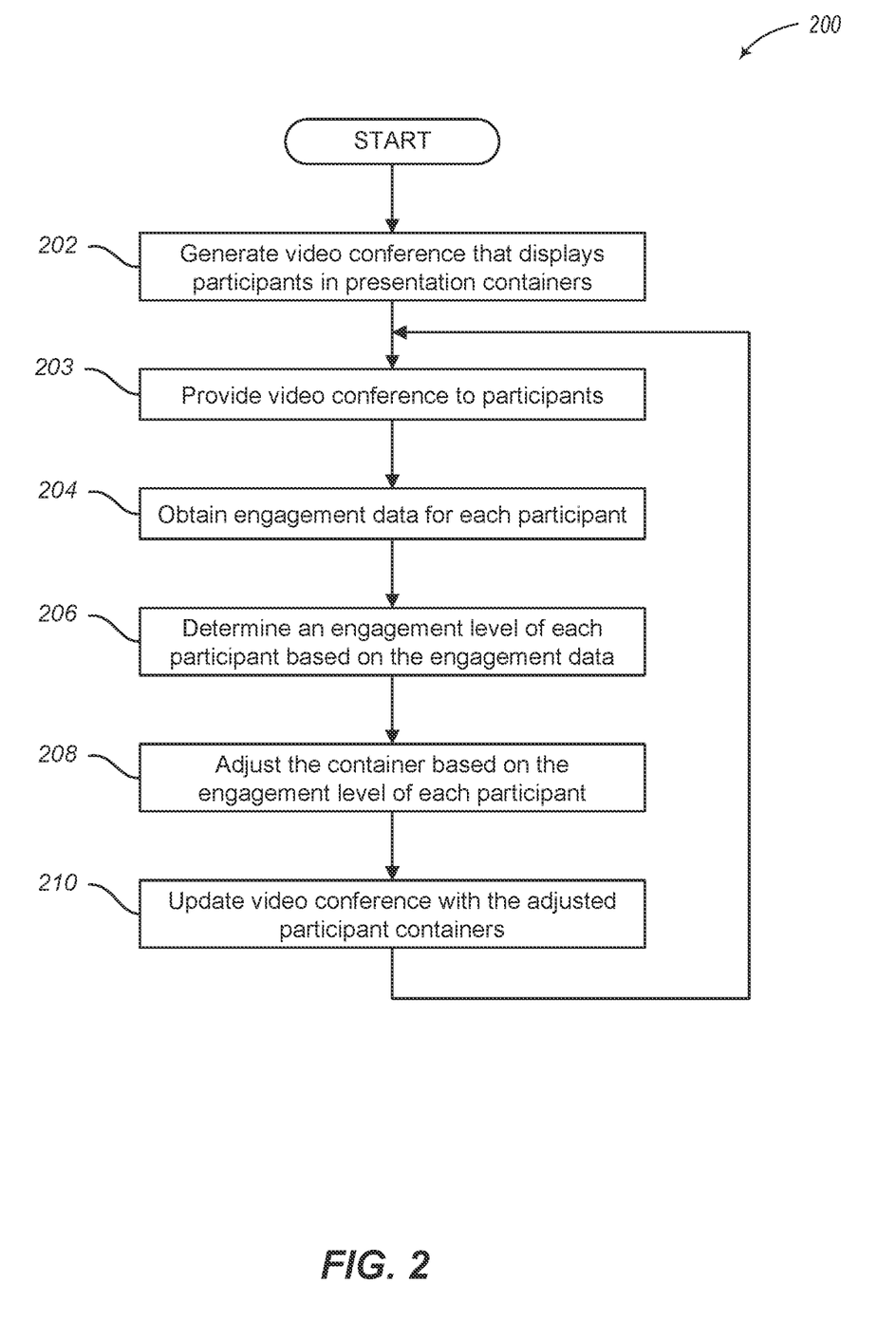
FIG. 2 illustrates a logical flow diagram generally showing one embodiment of a process for determining an engagement level of participants of a video conference in accordance with embodiments described herein.

FIG. 2 illustrates a logical flow diagram generally showing one embodiment of a process 200 for determining an engagement level of participants of a video conference in accordance with embodiments described herein. The video conference may be managed by the video conference server 102, by a participant computing device 104a-104d, or another computing device configured to manage a video conference.

Process 200 begins, after a start block, at block 202, where a video conference is generated to display each participant in a respective presentation container.

Each participant's video and audio data is associated with a separate participant container. In this way, a presentation container displays the participants' video data, a representation of the participant, etc. In some embodiments, each presentation container is a user interface element that includes a representation of particular participant. The presentation container may be a bubble, cloud, square, circle, rectangle, or other shape. In various embodiments, the representation of a participant in a presentation container includes one or more characters (such as a letter, number, or other character), live video feed, an image, or other digital representations of a participant. Moreover, in some embodiments, the shape of each presentation container is uniform. In other embodiments, two or more presentation containers may have different shapes. As discussed in more detail below, the shape of one or more presentation containers may change based on the engagement level of corresponding participants.

Process 200 continues at block 203, where the video conference is provided to each participant to be displayed on the participant computing devices.

Process 200 proceeds to block 204, where engagement level data is obtained for each participant. As mentioned herein, the engagement level data may include video data, audio data, or a combination therefore. Therefore, the engagement level data may include data describing: the participant's voice, such as pitch, tone, volume, speaking speed, length of time speaking, or other vocal characteristics; the movement of the participant, such as nodding, eye movement, arm movement, or other physical movements; whether the participant is addressing a certain person in the video conference; or other types of data that can indicate how a participant is interacting with the video conference or other participants; or some combination thereof.

Process 200 proceeds to block 206, where an engagement level of each participant is determined based on the engagement level data obtained from a respective participant.

The engagement level is determined based on the engagement level data obtained in block 204. One type of engagement level data or a plurality of types of engagement level data may be utilized to determine the engagement level. For example, in some embodiments, only the amount of time speaking is utilized to determine the engagement level. In other embodiments, a combination of time speaking, volume, and hand motion may be used to determine the engagement level.

As one example, a participant whose voice has a high volume and has talked for 20 minutes would have a higher engagement level than a participant who has only talked for 5 minutes during the video conference. In some embodiments, the engagement level data for differing types of engagement level data is normalized in order to compare the data and determine the engagement level. In other embodiments, the engagement level data for differing types of engagement level data may be weighted to indicate importance of engagement. For example, length of speaking time may be weighted higher than arm movement.

In various embodiments, at least a portion of the engagement level is determined by applying statistical analysis to the engagement level data. Several non-exhaustive examples of the statistical analysis used to determine at least a portion of the engagement level are included above in the discussion of FIG. 1. In various embodiments, at least a portion of the engagement level is determined by inputting the engagement level data into an artificial intelligence or machine learning model trained to determine an engagement level based on engagement level data.

The engagement level may be represented by using a number system, characters, words (e.g. "low", "medium", "high"), or other representations for a level within a range. For example, the engagement level may be represented by a number between 1 and 10, where 1 is an extremely low engagement level and 10 is an extremely high engagement level.

Process 200 proceeds to block 208, where the presentation container for one or more participants is adjusted based on the engagement level of one or more participants. As mentioned above, in some embodiments, an individual participant's engagement level may be used to adjust a corresponding presentation container for that participant. In other embodiments, the engagement levels of each participant may be used collectively to adjust one or more presentation containers.

In various embodiments, the adjustment to a presentation container includes one or more of changing a size of the presentation container, changing a shape of the presentation container (such as changing or morphing the shape to another shape), moving the presentation container within the display screen (e.g., moving the presentation container left or right or up or down, shaking the presentation container, or performing other types pf movements or motions). For example, as a participant increases the time in which they are talking, their presentation container slowly moves towards the top of the screen and may take a cloud-like shape. Conversely, if the participant stops talking for some period of time, then their presentation container may slowly sink towards the bottom of the screen and morphs into a brick-like shape.

Figure 3A:
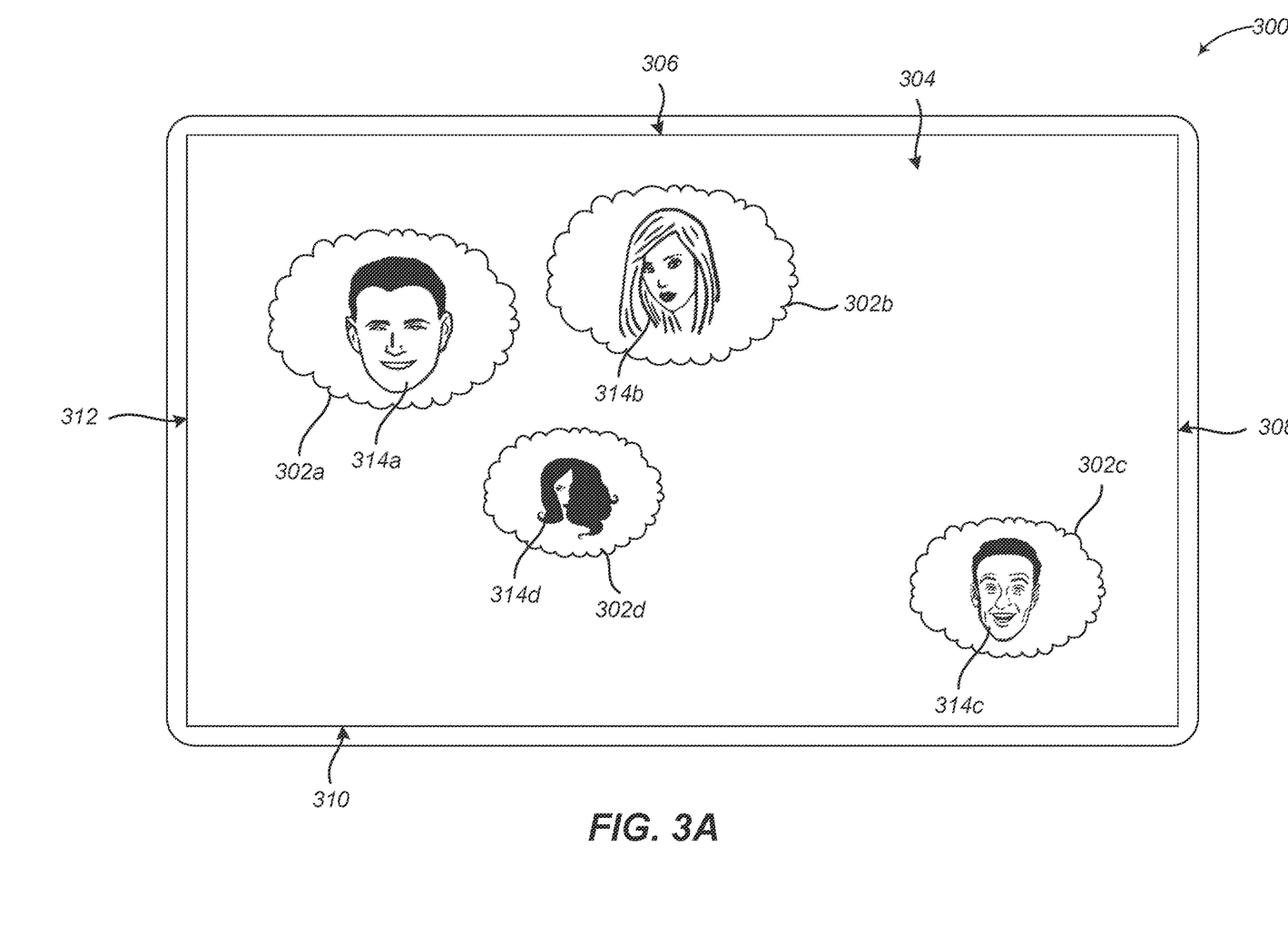
FIG. 3A illustrates a sample video conferencing interface at a first time, according to various embodiments described herein.
Figure 3B:
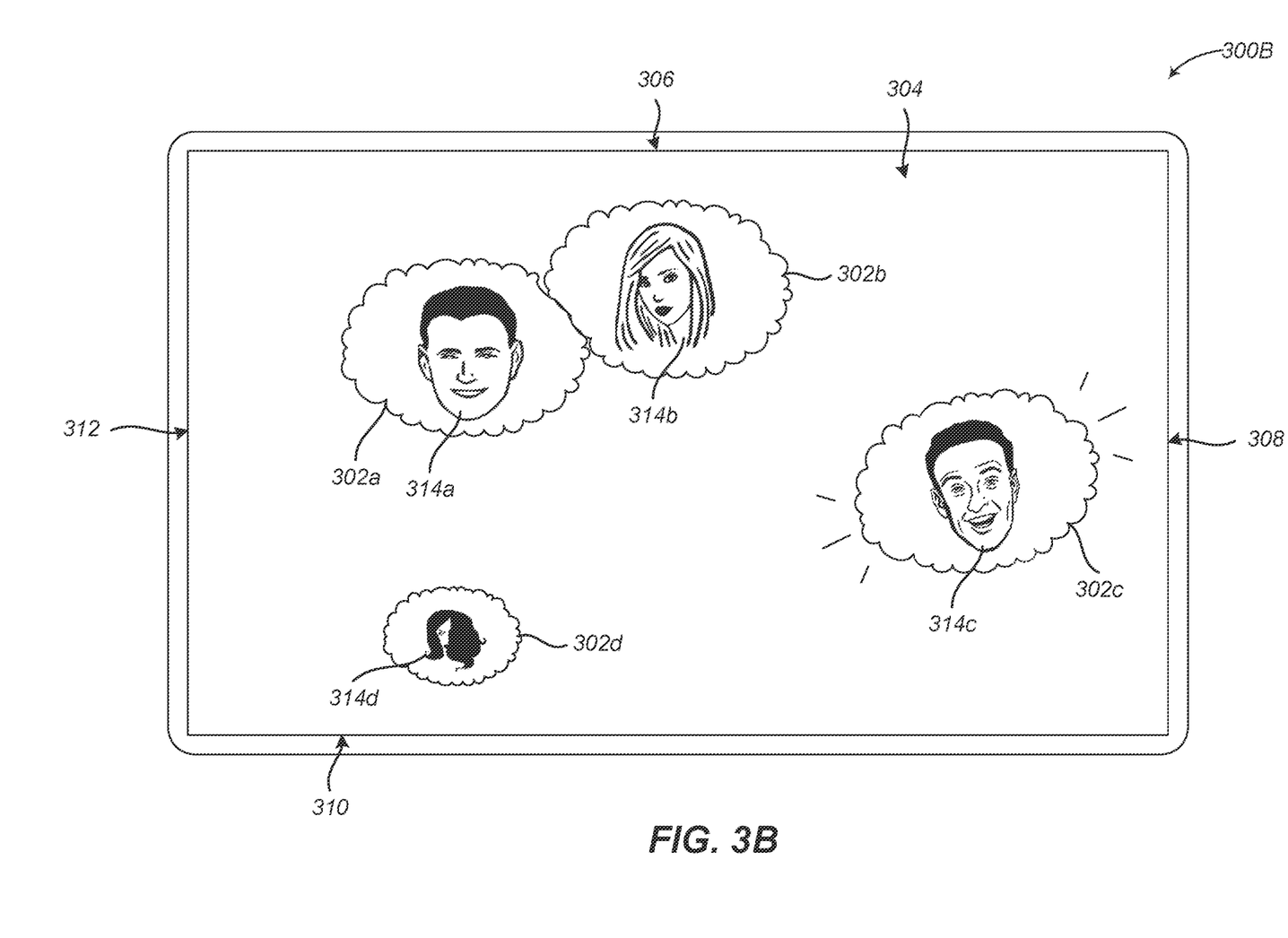
FIG. 3B illustrates a sample video conferencing interface at a second time, according to various embodiments described herein.

For example, participant A may have a higher engagement level than participant B. In that case, participant A's container may be adjusted to be larger than participant B's container to visually indicate A's higher engagement level. In various embodiments, adjusting the size and position of the container includes animating the container, such as by changing the container's shape, moving the container in a certain manner, or other animations. In various embodiments, the magnitude of the adjustment to the size or position of the container is based on the engagement level of the participant represented by the container. FIGS. 3A and 3B show an example of how the presentation containers can change based on the engagement levels. In various embodiments, the changes in the presentation containers occur relative to one or more other presentation containers. For example, as the engagement level for participant A increases participant A's container may grow larger and move towards the top of the screen, while a second participant B's container may shrink smaller and move towards the bottom of the screen even though participant B's engagement level remains unchanged.

The speed at which the presentation container is adjusted may be determined based on a collective engagement level over the length of the video conference or other factors. For example, if a participant does not speak for the first 20 minutes of the video conference and then interjects a comment with a high volume, then that participant's presentation container may quickly rise towards the top of the screen. But as soon as that participant is done speaking then their participant container may quickly sink towards the bottom of the screen. Conversely, if a participant is consistently speaking for the first 20 minutes of the video conference and then stops speaking, then that participant's presentation container may slowly move towards the bottom of the screen. But as soon as the participant resumes speaking, then their presentation container may quickly move towards the top of the screen. As another example, the presentation container of this heavy speaking participant may move left or right to make room for another participant's presentation container as that other participant begins to get more involved with the conversation.

Process 200 continues to block 210, where the video conference is updated to reflect the adjustments to the one or more presentation containers.

After block 210, process 200 loops to block 203 to provide the updated video conference to the participants. In some embodiments, an aggregated video feed of the video conference may be provided to the participant computing devices. In other embodiments, simple instructions may be provided to the participant computing devices to indicate the adjustments to one or more presentation containers. For example, the video conference server may provide an identifier of the participant container and a movement instruction to the participant computing devices. The participant computing devices can then use the identifier and the movement instruction to change the appearance of the corresponding participant container.

In some embodiments, the video conference server can provide different instructions to different participant computing devices. For example, assume there are four participants, participant_A, participant_B, participant_C, and participant_D, and participant_A and participant_B are speaking to each other and participant_C and participant_D. The display screens for Participant_A and Participant B may show their respective presentation containers at a top of the screen with the presentation containers of Participant_C and Participant_D at the bottom of the screen. Conversely, the display screens for Participant_C and Participant_D may show their respective presentation containers at a top of the screen with the presentation containers of Participant_A and Participant B at the bottom of the screen. In this way, the engagement levels of participants with one another can impact how the participant containers are displayed on each respective participant computing device.

In various embodiments, all or part of the process 200 is performed by one or more of the video conference server 102 or one or more of the participant computing devices 104a-104d.

FIG. 3A illustrates a sample video conferencing interface 300A at a first time, according to various embodiments described herein. The video conferencing interface 300A includes a screen 304, which includes a top 306, a right side 308, a bottom 310, a left side 312, and presentation containers 302a-302d. The screen 304 is used to display the presentation containers 302a-302d. The presentation containers 302a-302d each include a representation of one or more participants 314a-314c. The size and position of the presentation containers 302a-302d can change based on the engagement level of the respective participants 314a-314d.

In the example illustrated in FIG. 3A, each of the participants 314a-314d have a different engagement level. For example, participant 314a has an engagement level of 7 on a scale of 1-10, where 1 is the lowest level of engagement and 10 is the highest level of engagement. Participant 314b may have an engagement level of 8, participant 314c may have an engagement level of 2, and participant 314d may have an engagement level of 5.

In the example illustrated in FIG. 3A, presentation container 302a is displayed near the top 306 and right 312, and is larger than presentation containers 302d and 302c due to participant's 314a engagement level of 7. Likewise, presentation container 302b is closer to the top 306 than presentation container 302a, and is larger than presentation containers 302c and 302d, due to participant's 314b engagement level of 8. Additionally, presentation container 302c is displayed near the bottom 310 and left 308, and is smaller than presentation containers 302a and 302b due to participant's 314c engagement level of 2. Furthermore, presentation container 302d is displayed near the bottom 310 and right 312, and is smaller than presentation containers 302a and 302b due to participant's 314d engagement level of 5.

FIG. 3B illustrates a sample video conferencing interface 300B at a second time, according to various embodiments described herein. The second time of video conferencing interface 300B takes place after the first time of video conferencing interface 300A FIG. 3A, and could be any period of time later, such as one minute, one second, one hour, or another time period.

In the example illustrated in FIG. 3B, participants 314a and 314b had been talking to each other for some time, thus they are more engaged with each other and have a generally high engagement level within the video conference. As a result, their presentation containers 302a and 302b, respectively, are closer together than the other presentation containers 302c and 302d and they are closer to the top 306 of the screen 304.

Additionally, participant 314d has not talked in some time, and thus has a lower engagement level than before. As a result, their presentation container 302d has become smaller and moved lower and to the left towards the bottom 310 and left side 312 to become less prominent. In contrast, participant 314c has begun talking as well, and has an increased engagement level. For example, the participant 314c may have laughed at something said by participant 314a. The presentation container 302c has changed to be bigger and move closer to presentation containers 302a and 302b, and is now shaking, to show the change in the participant's 314c increased engagement level.

In various embodiments, the presentation containers 302a-302d can move closer together when multiple participants 314a-314d are talking to each other. In some embodiments, the video conference server 102 determines whether certain participants 314a-314d are talking to each other based on their engagement level data. The determination of whether certain participants 314a-314d are talking to each other may be made by applying statistical analysis, artificial intelligence or machine learning analysis, or other data analysis methods to the engagement level data. For example, engagement level data that shows two participants, e.g., participants 314a and 314b, talked disproportionately more than other participants in the video conference may indicate that those two participants were talking to each other. Additionally, in some embodiments, the engagement level data includes data describing how many times a participant's name was used. The data describing how many times a participant's name was used may be used to infer that one or more participants were talking to each other. For example, the data may indicate that participant 314a mentioned participant's 314b name multiple times, this information may be used to infer that participants 314a and 314b are talking to each other, and thus move their presentation containers 302a and 302b closer to one another.

In some embodiments, one or more of the presentation containers 302a-302d may have a filter applied to alter the representation of the participant 314a-314d based on the participant's engagement level. In some embodiments, text, symbols, icons, or graphics may be applied to one or more of the presentation containers 302a-302d based on the participant's engagement level. For example, a sun icon may be added to a presentation container representing a highly engaged participant. In contrast, a storm cloud icon may be added to a presentation container representing a non-engaged participant. In other embodiments, text, symbols, icons, or graphics may be applied near or relative to a presentation container based on the participant's engagement level. For example, a sun icon may be added to the video conference above one or more presentation containers representing highly engaged participants. Conversely, one or more presentation containers may be placed inside a storm cloud graphic to represent non-engaged participants.

Figure 4:
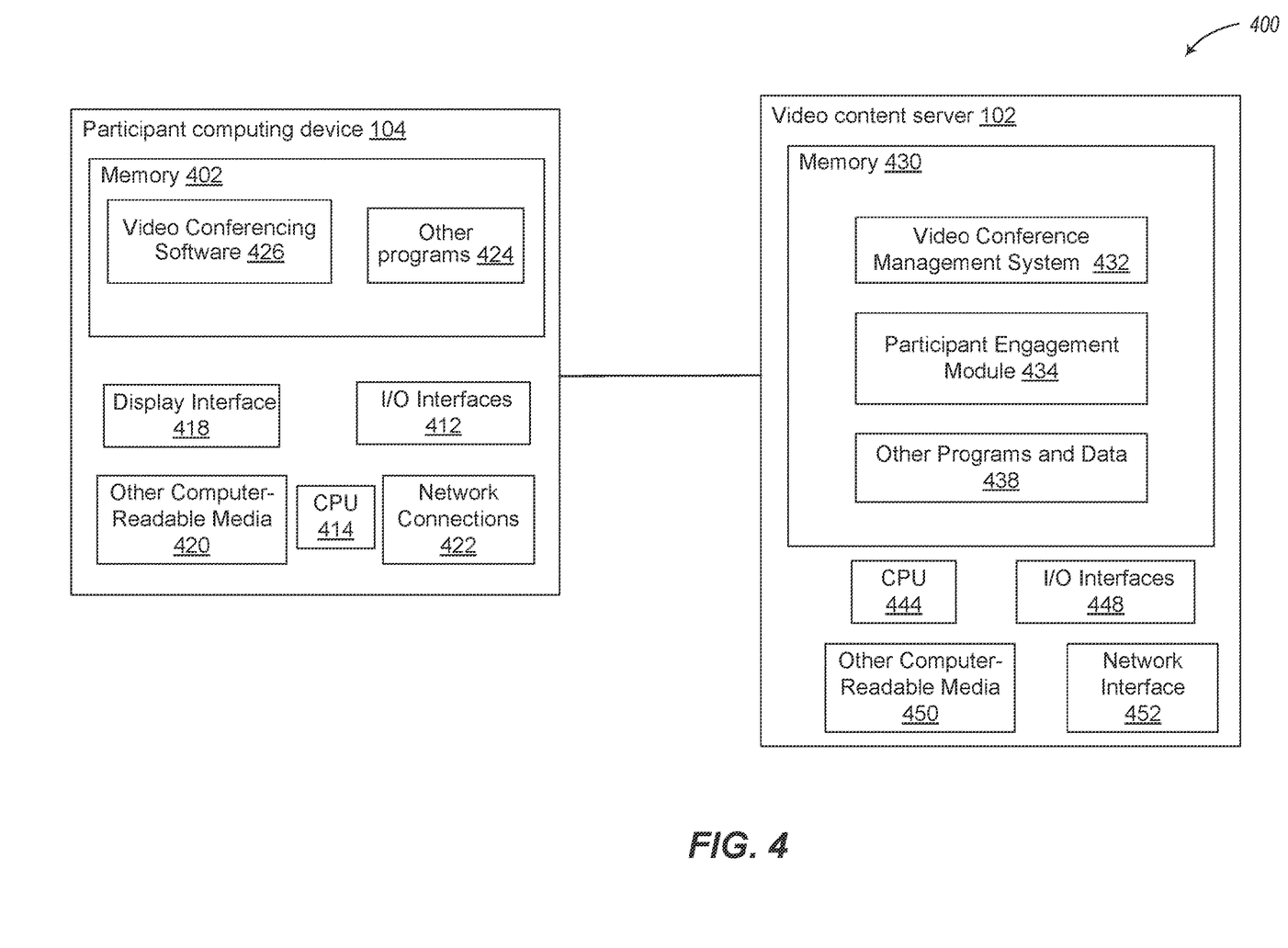
FIG. 4 shows a system diagram that describes one implementation of computing systems for implementing embodiments described herein.

FIG. 4 shows a system diagram that describes one implementation of computing systems for implementing embodiments described herein. System 400 includes video conference server 102 and one or more participant computing devices 104. Only one participant computing device 104 is shown in FIG. 4 for ease of discussion, however multiple computing devices can be used to join a conference.

As described herein, the video conference server 102 is a computing device that can perform functionality described herein for managing a managing a video conference and presenting the video conference to the mobile computing device 12. Additionally, the video conference server 102 is able to determine an engagement level of each participant of the video conference and alter presentation containers within the video conference based on the determined engagement levels, as described herein. One or more special purpose computing systems may be used to implement the video conference server 102. Accordingly, various embodiments described herein may be implemented in software, hardware, firmware, or in some combination thereof. The video conference server 102 includes memory 430, one or more processors 444, network interface 452, other input/output (I/O) interfaces 448, and other computer-readable media 450. In some embodiments, the video conference server 102 may be implemented by cloud computing resources.

Processor 444 includes one or more processing devices that execute computer instructions to perform actions, including at least some embodiments described herein. In various embodiments, the processor 444 may include one or more central processing units ("CPU"), programmable logic, or other processing circuitry.

Memory 430 may include one or more various types of non-volatile or volatile storage technologies. Examples of memory 430 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 430 may be utilized to store information, including computer-readable instructions that are utilized by processor 444 to perform actions, including at least some embodiments described herein.

Memory 430 may have stored thereon a video conference management system 432. The video conference management system 432 manages video conferences participated in by a participant using the participant computing device 104, as described herein.

Memory 430 may include a participant engagement module 434 for determining an engagement level of each participant in the video conference. Memory 430 may also store other programs 438. The other programs 438 may include other operating systems, user applications, or other computer programs.

Network interfaces 452 is configured to communicate with other computing devices, such as participant computing device 104, via a communication network 110. Network interfaces 452 include transmitters and receivers (not illustrated) to send and receive data associated with the multi-dimensional fabric described herein.

Other I/O interfaces 448 may include interfaces for various other input or output devices, such as audio interfaces, other video interfaces, USB interfaces, physical buttons, keyboards, haptic interfaces, tactile interfaces, or the like. Other computer-readable media 450 may include other types of stationary or removable computer-readable media, such as removable flash drives, external hard drives, or the like.

The participant computing device 104 is a computing device that is remote from video conference server 102 and can perform functionality described herein for participating in a video conference, as described herein. In various embodiments, the participant computing device 104 participates in a video conference hosted or managed by the video conference server 102. One or more special-purpose computing systems may be used to implement the participant computing device 104. Accordingly, various embodiments described herein may be implemented in software, hardware, firmware, or in some combination thereof.

The participant computing device 104 includes memory 402, one or more processors 414, network interfaces 422, display interface 418, other input/output (I/O) interfaces 412, and other computer-readable media 420. The memory 402, processor 414, network interfaces 422, other I/O interfaces 412, and other computer-readable media 420 may be similar to, include similar components, or incorporate embodiments of memory 430, processor 444, network interface 452, other I/O interfaces 448, and other computer-readable media 450 of video conference server 102, respectively. Thus, processor 414 includes one or more processing devices that execute computer instructions to perform actions, including at least some embodiments described herein. In various embodiments, the processor 414 may include one or more CPUs, programmable logic, or other processing circuitry.

Memory 402 may include one or more various types of non-volatile and/or volatile storage technologies. Memory 402 may be utilized to store information, including computer-readable instructions that are utilized by processor 414 to perform actions, including at least some embodiments described herein. Memory 402 may store various modules or programs, including video conferencing software 426. The video conferencing software 426 may perform embodiments similar to the video conference management system 432 on the video conference server 102. Additionally, the video conferencing software 426 may display a video conference to, obtain input from, and obtain engagement level data for a participant of the participant computing device 104. Memory 402 may also store other programs 438.

Display interface 418 is configured to output images, content, or information to a participant via a display device (not shown). Such a display device may include, but are not limited to, LCD screens, LEDs or other lights, or other types of display devices.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:
1. A system, comprising:
a plurality of participant computing devices, each participant computing device includes:
a first memory that stores first computer instructions; and
a first processor that executes the first computer instructions to:
display a video conference of participants of the plurality of computing devices, wherein a representation of each participant is display in a respective presentation container; and
capture video and audio of a respective participant during the video conference; and
a video conference server that includes:
a second memory that store second computer instructions; and
a second processor that executes the second computer instructions to:
receive the video and audio from the plurality of participant computing devices;
determine an engagement level of each participant of the plurality of participant computing devices based on an analysis of the video and audio data;
modify two or more characteristics of one or more presentation containers for one or more respective participants in the video conference based on the engagement level of the one or more respective participants, wherein modifying two or more characteristics of one or more presentation containers includes:

causing at least one presentation container to move relative to at least one other presentation container; and causing the shape of at least one presentation container to change; and provide the modified presentation containers to the plurality of participant computing devices for display in the video conference.

2. The system of claim 1, wherein the second processor determines the engagement level by further executing the second computer instructions to:

determine the engagement level for at least one participant based on video and audio data received from at least two participant computing devices of the plurality of participant computing devices.

3. The system of claim 1, wherein the second processor determines the engagement level by further executing the second computer instructions to:

determine the engagement level for at least one participant based on the audiovisual data received from the at least one participant.

4. The system of claim 1, wherein the second processor determines the engagement level by further executing the second computer instructions to:

determine the engagement level for at least one participant based on the audiovisual data received from at least one other participant.

5. The system of claim 1, wherein the second processor determines the engagement level by further executing the second computer instructions to:

determine whether two or more participants of the plurality of participant computing devices are interacting with each other based on the video and audio data received from the at least two participant computing devices; and determine the engagement level for the at least one participant based on whether the two or more participants are interacting with each other.

6. The system of claim 1, wherein the second processor modifies the characteristic of the one or more presentation containers by further executing the second computer instructions to:

select the characteristic of the one or more presentation containers to modify based on the engagement level for the one or more respective participants;

determine at least one magnitude for modifying the selected characteristic based on the engagement level for one or more respective participants; and modify the selected characteristic of one or more presentation containers for the one or more respective participants based on the at least one magnitude.

7. The system of claim 1, wherein the second processor modifies the characteristic of the one or more presentation containers by further executing the second computer instructions to:

modify at least one of a position, size, shape, or movement of the one or more presentation container based on the engagement level for the one or more respective participants.

* * * * *